US007051103B1

(12) United States Patent
Giroir et al.

(10) Patent No.: US 7,051,103 B1
(45) Date of Patent: May 23, 2006

(54) METHOD AND SYSTEM FOR PROVIDING SNA ACCESS TO TELNET 3270 AND TELNET 3270 ENHANCED SERVICES OVER WIDE AREA NETWORKS

(75) Inventors: Didier Giroir, Cagnes sur Mer (FR); Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 09/718,187

(22) Filed: Nov. 21, 2000

(30) Foreign Application Priority Data

Nov. 25, 1999 (EP) .................................. 99480118

(51) Int. Cl.
*G06F 15/16* (2006.01)

(52) U.S. Cl. ...................... 709/227; 709/228; 709/220; 709/203

(58) Field of Classification Search ................ 709/203, 709/217–219, 226–228, 237–238, 232, 223–224, 709/220–221
See application file for complete search history.

(56) References Cited

U.S. PATENT DOCUMENTS

| 5,623,601 | A | * | 4/1997 | Vu .............................. 713/201 |
| 5,742,762 | A | * | 4/1998 | Scholl et al. ............... 709/200 |
| 5,835,725 | A | * | 11/1998 | Chiang et al. .............. 709/228 |
| 6,006,264 | A | * | 12/1999 | Colby et al. ................ 709/226 |
| 6,049,833 | A | * | 4/2000 | Chan et al. ................. 709/237 |
| 6,122,276 | A | * | 9/2000 | Boe et al. .................... 370/389 |
| 6,128,662 | A | * | 10/2000 | Bolton et al. ............... 709/228 |
| 6,167,027 | A | * | 12/2000 | Aubert et al. ............... 370/230 |
| 6,233,543 | B1 | * | 5/2001 | Butts et al. ................... 703/27 |
| 6,389,462 | B1 | * | 5/2002 | Cohen et al. ............... 709/218 |
| 6,430,595 | B1 | * | 8/2002 | Ferguson et al. ........... 709/223 |
| 6,532,241 | B1 | * | 3/2003 | Ferguson et al. ........... 370/469 |
| 6,665,702 | B1 | * | 12/2003 | Zisapel et al. .............. 709/238 |

\* cited by examiner

*Primary Examiner*—Philip B. Tran
(74) *Attorney, Agent, or Firm*—John R. Pivnichny; Dillon & Yudell LLP

(57) ABSTRACT

An access device for establishing a Systems Network Architecture (SNA) session between an SNA Client and an SNA application using Telnet 3270 services over a communication network. The communication network, has Telnet 3270 servers for accessing the SNA application. The access device comprises logic for: (1) receiving from a Telnet 3270 client, a request for establishing a Telnet 3270 session with a Telnet 3270 Server, the request comprising an identification of the SNA client associated with the Telnet 3270 client, (2) selecting a communication path within the communication network to access a Telnet 3270 server providing services to the SNA client by referring to a configuration table, which comprising, for each SNA client, one or more communication paths leading to one or more Telnet 3270 servers, and (3) forwarding the Telnet 3270 session request to a selected Telnet 3270 server along the selected communication path.

25 Claims, 5 Drawing Sheets

TN3270 Wide Area Network Access Device a) Physical View b) Logical View

Access Device Proxy ARP Services

METHOD AND SYSTEM FOR PROVIDING SNA ACCESS TO TELNET 3270 AND TELNET 3270 ENHANCED SERVICES OVER WIDE AREA NETWORKS

BACKGROUND OF THE INVENTION

1. Technical Field

The present invention relates to computer networks and more particularly to a method and system for providing Systems Network Architecture (SNA) Access to Telnet 3270 (TN3270) and Telnet 3270 Enhanced (TN3270E) services over Wide Area Networks based on technologies such as Frame Relay (FR), Asynchronous Transfer Mode (ATM), Switched Multimegabit Data Services (SMDS) or Integrated Services Digital Network (ISDN).

2. Description of the Related Art

Every day, for all sorts of reasons, more and more companies are focusing on the consolidation of the multiple specialized networks they directly operate or lease from service providers onto a single protocol network. These multiple specialized networks are based on diverse networking technologies such as Systems Network Architecture (SNA), Internet Protocol (IP) or Internetwork Packet Exchange (IPX). These companies are making the consolidation one of their top priorities, and they are almost exclusively selecting IP (the Internet Protocol) as their protocol of choice. However, for the overwhelming majority of these companies that are using SNA protocols and applications, there still is and will be for the many years to come, a major requirement for employees to keep the capability they always had to have access to the huge amount of existing corporate data residing in traditional mainframes and accessible through SNA applications.

TN3270 and TN3270 Enhanced

In an IP environment, a widely used technique for the transport of SNA information across IP networks is the use of Telnet technologies (TN3270 and TN3270 Enhanced). This technique for SNA green screen workstation users is a Client/Server approach. Host On Demand from IBM or WebClient from CISCO are examples of Client software implementations. Network Utility from IBM or CISCO router's offerings are typical Server implementations (hardware and software).

The TN3270 Client usually runs within the customer's workstation while the Server is usually placed in front of the customer's Data Center mainframes (or sometimes directly within the mainframe itself) or within the customer branch offices. As illustrated in FIG. 1, IP protocols 102 are used between the Server 100 and the Clients 101, while traditional SNA protocols 103 are used between the Server 100 and the target Applications 104 within the mainframe. More information concerning Telnet, TN3270, TN3270 Enhanced, Network Utility and more generally SNA over IP can be found in the following publications incorporated herewith by reference:

IBM 2216/Network Utility Host Channel Connection, Erol Lengerli, Jacinta Carbonell, Thomas Grueter; IBM International Technical Support Organization, January 1999, SG24-5303-00.

IBM Network Utility Description and Configuration Scenarios, Tim Kearby, Peter Gayek, Gallus Schlegel, Imre Szabo, Zhi-Yong Zhang; IBM International Technical Support Organization, January 1999, SG24-5289-00.

Internetworking with TCP/IP—Volume I—Principles, Protocols, and Architecture Douglas E. Comer, Second Edition, Prentice Hall 1991.

SNA and TCP/IP Integration, Jerzy Buczak, Karl Wozabal, Antonio Luca Castrichella, Heikki Lehikoinen, Maria Cristina Madureira, Tsutomu Masaoka, IBM International Technical Support Organization, April 1999, SG24-5291-00.

TCP/IP Tutorial and Technical Overview, Martin W. Murhammer, Orcun Atakan, Stefan Bretz, Larry R. Pugh, Kazunari Suzuki, David H. Wood, IBM International Technical Support Organization, October 1998, GG24-3376-05.

Request For Comments (RFCs) from the Internet Engineering Task Force (IETF):

RFC 1576: TN3270 Current Practices,
RFC 1646: TN3270 Extensions for LU name and Printer Selection,
RFC 1647: TN3270 Enhancements,
RFC 2355: TN3270 Enhancements.

Wide Area Networks

Data transmission with a specific focus on applications is now evolving by integrating a fundamental shift in the customer traffic profile. Driven by the growth of the number of intelligent (programmable) workstations, the pervasive use of local area network (LAN) interconnections, the distributed processing capabilities between workstations and super computers, the new applications and the integration of various and often conflicting structures (e.g., hierarchical versus peer to peer, wide versus local area networks, voice versus data), the data profile consumes more bandwidth and requires more connectivity. The data profile is also bursting and non-deterministic. Based on the above observations, there is a strong requirement for supporting distributed computing applications across high speed wide-area networks that can carry local area network communications, voice and data traffic (and sometimes also even video) among channel-attached hosts, business or engineering workstations, terminals, and small to large file server systems.

The vision of a high speed multi-protocol network is the driver for the emergence of fast packet or cell switching network architectures such as Frame Relay, Asynchronous Transfer Mode or Switched Multimegabit Data Services in which data, voice, or, even in some cases, video information is digitally encoded, chopped into small packets and transmitted through a common set of nodes and links. With the continuously evolving environment, there still is and will be for the many years to come, a major requirement for transporting legacy data traffic, such as System Network Architecture (SNA) traffic across Wide Area Networks.

More information about Wide Area Networks and more particularly about Frame Relay (FR), Asynchronous Transfer Mode (ATM) or Switched Multimegabit Data Services (SMDS) technologies can be found in the following publications incorporated herewith by reference:

High Speed Networking Technology: An Introductory Survey, IBM International Technical Support Organization, July 1995, GG24-3816-02; and Asynchronous Transfer Mode (Broadband ISDN)- Technical Overview, IBM International Technical Support Organization, June 1994, GG24-4330-00.

An efficient transport of mixed traffic streams on very high speed lines means that for these new network architectures, a set of strict requirements in terms of performance and resource consumption is needed. The set of requirements includes a very high throughput and a very short packet or cell processing time, an efficient set of flow and congestion control mechanisms, and a very large flexibility to support a wide range of connectivity options.

SUMMARY OF THE INVENTION

The TN3270 and TN3270 Enhanced (TN3270E) protocols require a full implementation of the complete TCP/IP protocols suite in TN3270 nodes. Implementing a full set of TCP/IP protocols is not only a complex task but also implies that each TN3270 node becomes a router with all the associated functions. This results in complexities and severe overhead caused by router to router protocols that are not really required just to transport SNA data. Additionally, the cost of the nodes that participate to the TN3270 protocols is greatly impacted by the amount of software to develop, distribute and maintain, the amount of memory and control blocks required for storing and executing the routing protocols, and the processing capacity required for the execution of the routing protocols.

It is an object of the present invention to provide simplified, comprehensive and integrated SNA access to Telnet 3270 services over Wide Area Networks such as Frame Relay (FR), Asynchronous Transfer Mode (ATM), Switched Multimegabit Data Services (SMDS) or Integrated Services Data Network (ISDN). More particularly, it is an object of the present invention to not require the Wide Area Network to provide sophisticated and costly IP protocols It is another object of the present invention to attach SNA Client devices (Workstations) or SNA Server devices (Host attached access devices such as Telnet 3270 Servers) to a Wide Area Network (FR, ATM, SMDS, ISDN network) and to enable meaningful communication across this Wide Area Network using traditional SNA protocols.

It is another object of the present invention to enable communication between a SNA Client device attached to a Wide Area network by means of an Access Device, and a Telnet 3270 Server attached to this Wide Area Network, using standard Telnet flows as if these two devices were locally adjacent (i.e attached to the same Local Area Network). From a Telnet 3270 standpoint, the Telnet 3270 Client device and the Telnet 3270 Server device appear as if these were logically interconnected via a Local Area Network.

It is another further object of the present invention to provide load balancing and more particularly to allow an Access Device to dynamically select one TN3270 Server device among a plurality of TN3270 Server devices for providing services to a SNA Client device.

It is another further object of the present invention to reduce the cost of implementing TN3270 services across a Wide Area Network, in particular by not requiring the implementation of a full TCP/IP protocol stack within the TN3270 Access Devices attaching the TN3270 Client devices to the Wide Area Network.

The present invention relates to computer networks and more particularly to a system and method in an access device for establishing a Systems Network Architecture (SNA) session between an SNA Client and an SNA application using Telnet 3270 services over a communication network. The SNA client provides Telnet 3270 client services. An access device provides access to the communication network, and the communication network has attached one or a plurality of Telnet 3270 servers for accessing the SNA application.

The method for use in an access device comprises the steps of (1) receiving from a Telnet 3270 client, a request for establishing a Telnet 3270 session with a Telnet 3270 Server, the request comprising an identification of the SNA client associated with the Telnet 3270 client, (2) selecting a communication path within the communication network to access a Telnet 3270 server providing services to the SNA client by referring to a configuration table, the configuration table comprising for each SNA client, one or plurality of communication paths leading to one or a plurality of Telnet 3270 servers, and (3) forwarding the Telnet 3270 session request to a selected Telnet 3270 server along the selected communication path.

The present invention further discloses an access device comprising means adapted for carrying out the claimed method.

The present invention also discloses a network comprising at least one Telnet 3270 client and at least one Telnet 3270 server, a plurality of nodes interconnected with links and the claimed access device.

The present invention further discloses a computer readable medium comprising instructions for carrying out the claimed method.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE PREFERRED EMBODIMENT

The preferred embodiment described in the specifications uses the Frame Relay standard as Wide Area Network technology. However, a person skilled in the art can easily adapt the means and ideas described in the present application to other Wide Area Network protocols such as Asynchronous Transfer Mode (ATM), Switched Multimegabit Data Services (SMDS) or Integrated Services Digital Networks (ISDN).

Extension of Networks

To remain competitive, network users extend their traditional internal SNA and IP networks outward to business partners, dealers, suppliers, and customers. In this expanding environment, users also search for ways to save money and provide connectivity between their mix of SNA and TCP/IP Server applications and their TCP/IP and SNA desktop Client population.

Consolidation of Networks

Many companies today envisage the consolidation of their WAN traffic onto a single IP-only backbone. At the same time, other companies simplify their workstation configurations and attempt to only run the TCP/IP protocol stack at the desktop. However, most of these companies still require access to SNA applications hosts.

TELNET 3270 and TELNET 3270 Enhanced

Figure 1:
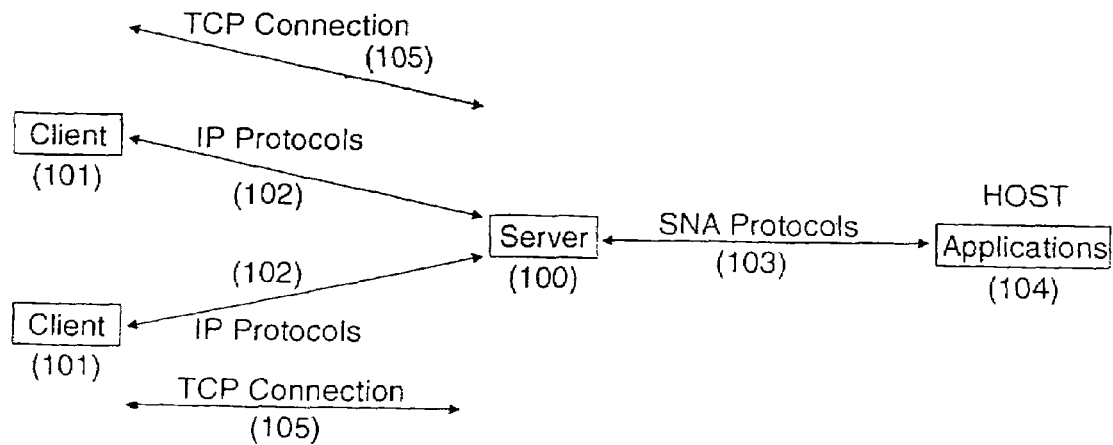
FIG. 1 illustrates the various connection protocols (SNA, IP and TCP) involved with Telnet 3270 services.

As shown in FIG. 1, TN3270 allows end users to run IP from the desktop 101, over the network and to access an SNA host 104 through a TN3270 Server 100. The TN3270 Clients connect to the TN3270 Server using TCP connections 105. The TN3270 Server 100 provides a gateway function for the downstream TN3270 Clients 101 by mapping Client sessions 105 to SNA dependent Logical Unit-Logical Unit (LU-LU) sessions 103 that the TN3270 Server 100 maintains with the SNA host 104. The TN3270 Server handles the conversion between the TN3270 data stream and an SNA 3270 data stream. In the present application, the terms TN3270 Client and SNA Client represent the same object and will be used indifferently.

As mentioned above, the path from a TN3270 Client to the SNA host comprises a TCP connection over IP from the Client to the Server 105, and an SNA LU-LU session from the Server to the host 103. Connecting to a host to establish an LU-LU session can be accomplished using a traditional subarea connection or using an Advanced Peer-to-Peer Networking (APPN) connection.

To deploy a TN3270 solution, TN3270 Client software 101 is installed on desktop workstations, and TN3270 Server software 100 is installed in one of several places discussed below.

TN3270 Client Software

Client software is available from IBM and many other vendors, and runs on top of the TCP/IP stack in the workstation. A given Client product provides one of two possible levels of standards support, Base TN3270 Client and TN3270E Client. Base TN3270 Client conform to RFC 1576 (TN3270 Current Practices) and/or RFC 1646 (TN3270 Extensions for LU name and Printer Selection). TN3270E Clients conform to RFC 1647 (TN3270 Enhancements), and RFC 2355 (TN3270 Enhancements).

TN3270 Server Software

The TN3270 Server function 100 can be placed in a variety of products and positions within a network, including in the SNA host itself, in a router in front of the data host or within the network, or in a specialized box within the network. A Server that can support TN3270E clients is called a TN3270E Server.

Traditional TELNET 3270 Services in High Speed Network

Figure 2:
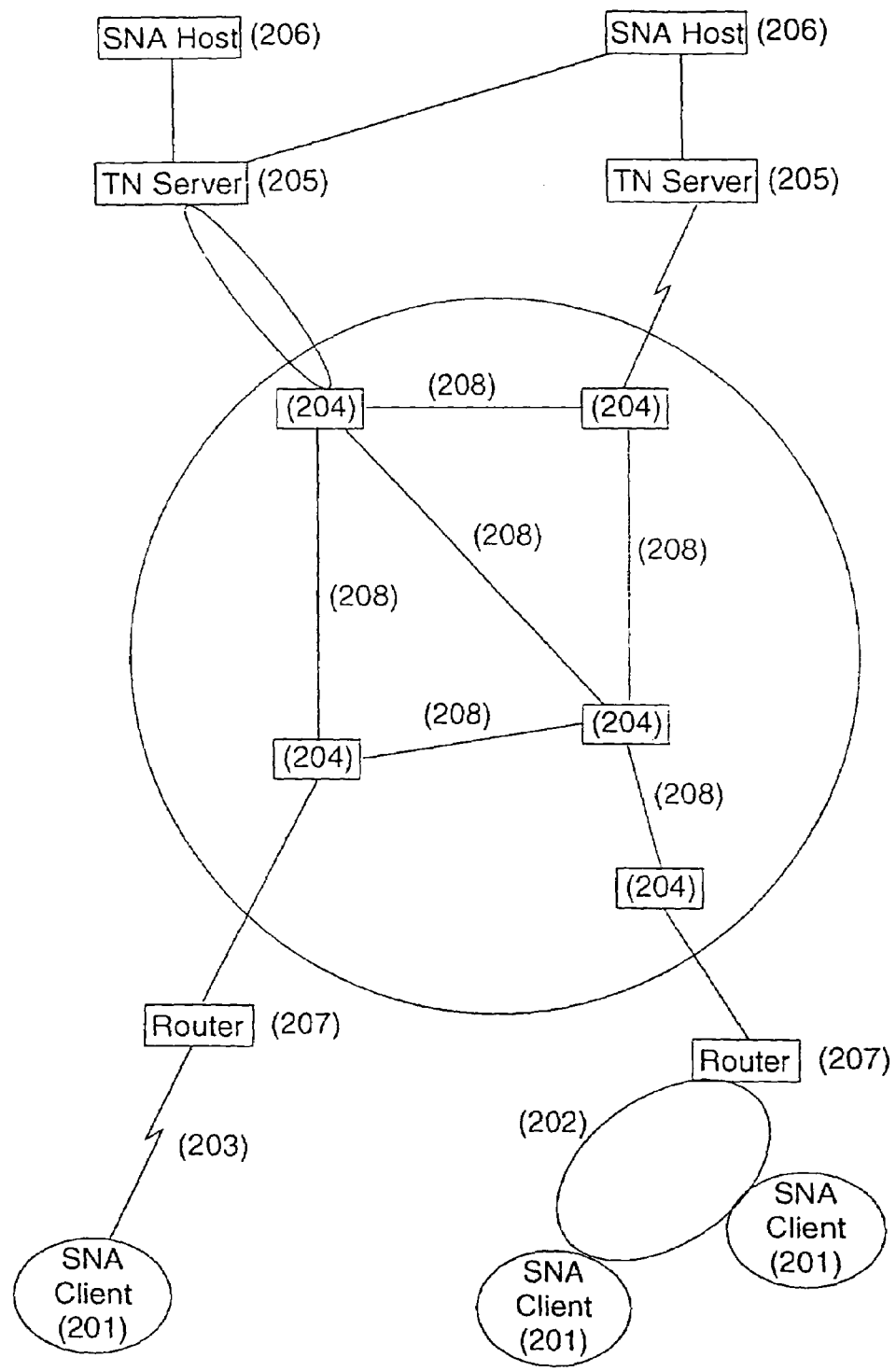
FIG. 2 shows traditional Telnet 3270 Services across a high speed Wide Area Network.

As illustrated in FIG. 2, a typical network model providing Telnet 3270 services across a Wide Area Network comprises several SNA Client devices (running the Telnet 3270 protocols) 201 attached via IP Routers 207 to Wide Area Network nodes 204. SNA Client devices are attached to IP routers via either Local Area Networks 202 or via point to point lines 203.

The Wide Area Network 200 comprises several network nodes 204 interconnected using communication lines provided by private carriers or by public data networks service providers 208. At the far end of the Wide Area Network 200, the Telnet 3270 Servers 205 are attached to the SNA Hosts 206 in which the SNA applications reside.

Internet Protocols

The support of TN3270 and TN3270 Enhanced (TN3270E) protocols in TN3270 nodes require a full implementation of the TCP/IP protocols suite. The method and system disclosed by the present invention strictly limit the TCP/IP protocols to be implemented by the Frame Relay SNA Access Device to their bare minimum. Complex dynamic IP routing protocols such as RIP (Routing Information Protocol) or OSPF (Open Short Path First) do not need to be implemented within the Wide Area Network.

Frame Relay Protocols

Frame Relay is a fast packet switching technology. Because the fast packet switching operates at layer 2 of the OSI (Open Systems Interconnection) model, Frame Relay is protocol independent. Fast packet switches examine each packet and route these packets based on a common addressing technique.

Frame Relay is a connection-oriented networking technology, with Virtual Circuits (VC) defined between end-stations (Frame Relay Terminating Equipment or FRTE). The switching is done by a Frame Relay Frame Handler (FRFH). The standards for Permanent Virtual Circuits (PVCs) appear as recommendations in the ANSI and ITU-T (formerly CCITT) standards.

Frame Relay incorporates mechanisms to reach some network performance objectives, and to minimize the number of occurrences of user perceived congestion. Forward Explicit Congestion Notification (FECN) and Backward Explicit Congestion Notification (BECN) indicators are sent through the network to inform network nodes of congested conditions. End-stations are able to prioritize their traffic by using a Discard Eligibility (DE) bit in frame headers. In case of congestion, the network first discards frames having the DE bit set. Frame Relay provides guaranteed bandwidth for each Virtual Circuit, which prevents any user from consuming all the bandwidth. At the same time, Frame Relay allows any unused bandwidth to be shared by active users. Standards concerning Committed Information Rates (CIRs) have been defined and adopted. Communication Network Management (CNM) is facilitated by a Local Management Interface (LMI) defined for User-to-Network Interface (UNI) and Network-to-Network Interface (NNI).

Asynchronous Transfer Mode Protocols

The key concepts of the Asynchronous Transfer Mode (ATM) are as follows:

Cells

All information (voice, image, video, data, etc.) is transported through the network in very short (i.e., 48 data bytes plus a 5-byte header) blocks called cells.

Routing

Information flow is along paths (called virtual channels) set up as a series of pointers through the network. The cell header contains an identifier that links the cell to the correct path for it to take towards its destination. Cells on a particular virtual channel always follow the same path through the network and are delivered to the destination in the same order in which they were received.

Hardware-Based Switching

ATM is designed so that simple hardware-based logic elements may be employed at each node to perform the switching. On a link of 1 Gbps a new cell arrives and a cell is transmitted every 0.43 msec. Thus, there is not a lot of time to decide what to do with an arriving packet.

Adaptation

At the edges of the network, user data frames are broken up into cells, and continuous data streams such as voice and video are assembled into cells. At the destination side of the network, the user data frames are reconstructed from the received cells and returned to the end user in the form (data frames, etc.) that they were delivered to the network. This adaptation function is considered part of the network but is a higher-layer function from the transport of cells.

Error Control

The ATM cell-switching network only checks cell headers for errors and simply discards errored cells. The adaptation function is external to the switching network and depends somewhat on the type of traffic but for data traffic it usually checks for errors in data frames received and if one is found then it discards the whole frame. At no time does the ATM network attempt to recover from errors by the retransmission of information. This function is up to the end-user devices and depends on the type of traffic being carried.

Flow Controls

An ATM network has no internal flow controls of any kind. The required processing logic is too complex to be accommodated at the speeds involved. Instead ATM has a set of input rate controls that limit the rate of traffic delivered to the network. Other forms of input control are under discussion in various standards bodies.

Congestion Control

There is only one thing an ATM network can do when a link or node becomes congested. Cells are discarded until the problem has been relieved. Some (lower-priority) cells can be marked such that they are the first to be discarded in the case of congestion. Connection endpoints are not notified when cells are discarded. It is up to the adaptation function or higher-layer protocols to detect and recover from the loss of cells (if necessary and possible).

Access to TN3270 Services Across Wide Area Networks

Figure 3:
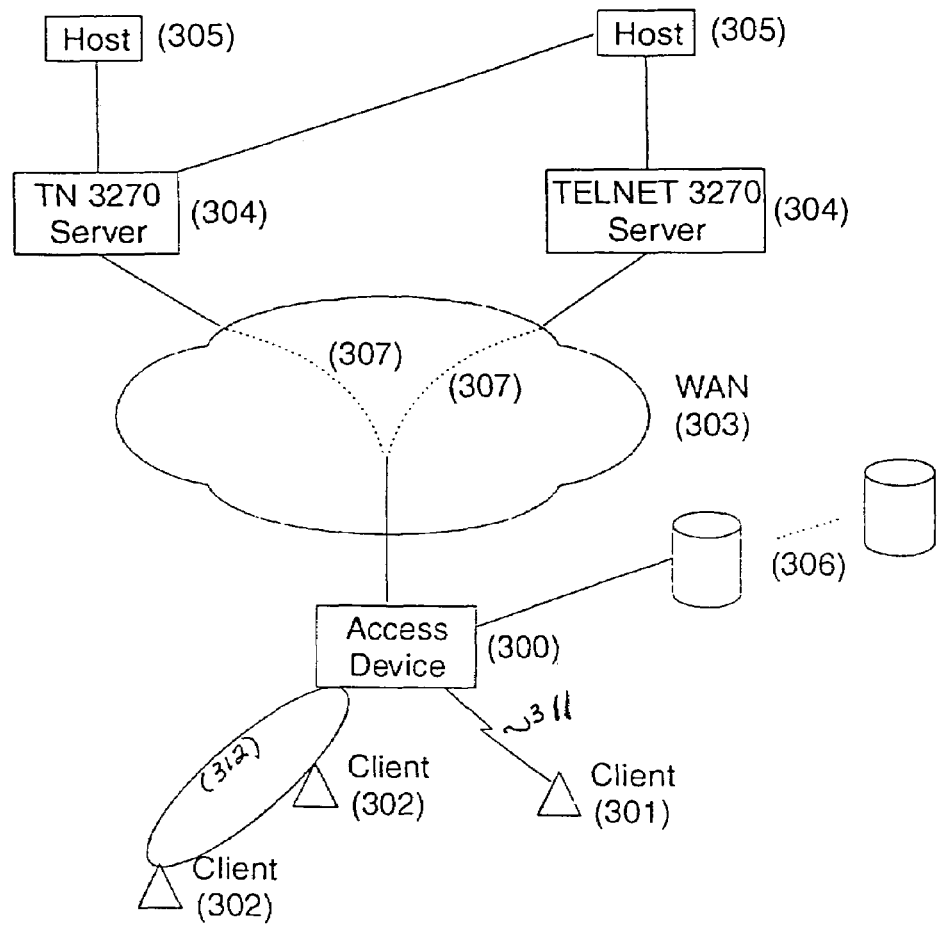
FIGS. 3A and 3B show a physical view and a logical view of the Telnet 3270 Access Device according to the present invention.
Figure 3:
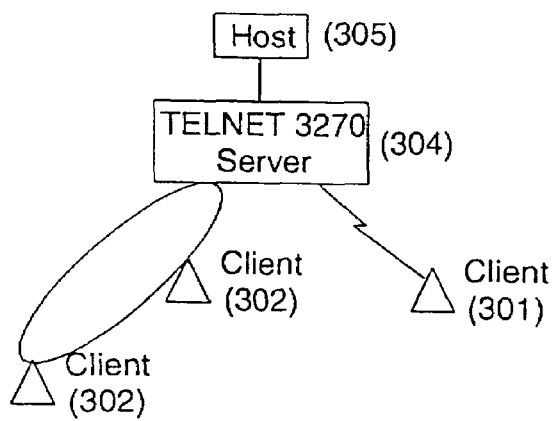

As shown in FIG. 3A, from a physical standpoint, the present invention discloses a method and system to provide a simplified but comprehensive access to Telnet 3270 services across Wide Area Networks. The Access Device 300 is placed between the SNA Client device 301 and 302 running the standard TN3270 Client protocols and the Wide Area Network 303.

The SNA Client device 301 and 302 can be attached to the Access Device 300 via a serial link 311 or via a Local Area Network 312. The Access Device 300 provides minimal IP functionality to allow Telnet 3270 Servers 304 at the far end of the Wide Area Network at which hosts 305 exist, to appear logically adjacent (in an IP terminology) to the SNA Client devices 301 and 302 attached to the Access Device 300. This minimal IP functionality simply consists of providing proxy ARP (Address Resolution Protocol) services. Such proxy ARP services provided by the Access Device are used by SNA Client Devices to connect to the Access Device via a Local Area Network.

As shown in FIG. 3B, from a logical standpoint, the SNA Client devices 301 and 302 running the Telnet 3270 Client protocols appear directly adjacent to the Telnet 3270 Server 304 providing access to the SNA Host 305 where SNA Applications reside. Of course, any number of Access Devices 300 may be attached to the Wide Area Network 303. Similarly, any number of TN3270 Servers 304 may be attached to the Wide Area Network 303. The role of the SNA Access Device 300 is to intercept the Telnet session setup request message from the attached SNA Client devices 301 and 302. Then, based on the Telnet session setup request message, the Access Device 300 determines the Telnet 3270 Server 304 to which the Telnet session request message must be forwarded. The SNA Logical Unit name of the Logical Unit (LU) associated with the SNA Client device 301 or 302 for this session is included in the Telnet session request message issued by the SNA Client device 301 or 302. The selected Telnet 3270 Server 304 is one of the Telnet 3270 Servers that provide services for the Logical Unit for which the SNA Client device 301 or 302 is initiating the Telnet session setup request message.

In a Frame Relay Wide Area Network, the Access Device determines—based on a pre-configured table 306—the Virtual Circuit (VC) 307 to access the selected Telnet 3270 Server. Once a Telnet 3270 has been selected by the Access Device, the Telnet session request message is forwarded by the SNA Access Device to the Telnet Server over the selected Frame Relay Virtual Circuit. This Virtual Circuit provides a path between the Access Device and the Telnet 3270 Server, across the Frame Relay Wide Area Network 303.

Once the Telnet session has been established between the SNA Client device and the Telnet 3270 Server, the SNA Access Device as well as the Wide Area Network are completely transparent. They just transport packets between the Client and the Server over the selected Virtual Circuit.

Access Device Configuration Table

Figure 5:
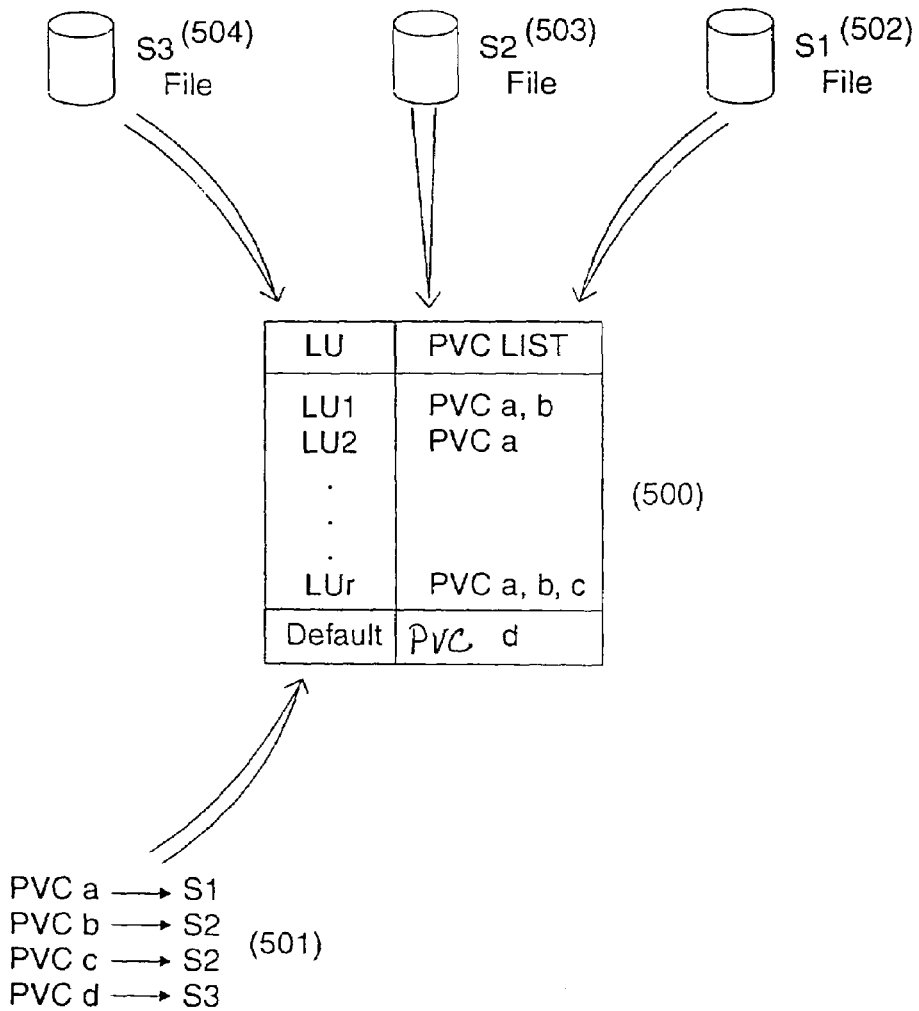
FIG. 5 shows how the Access Device configuration table is built according to the present invention.

As shown in FIG. 5, as an initialization phase, the SNA Access Device must be configured with all the information necessary for selecting a Virtual Circuit to associate with a Telnet session. The Virtual Circuits are the communication paths from the SNA access device to the TN3270 Servers to which the Telnet session setup requests must be forwarded to. An SNA Access Device configuration table is built, based on the configuration file 308 of each of the TN3270 Servers connected to the Wide Area Network and that communicate with the SNA Client Devices attached to the Access Device. In FIG. 5, three TN3270 Servers S1, S2, and S3 are shown. Each of these TN3270 Servers has a configuration file 308 (S1 file 502, S2 file 503, and S3 file 504), whose format is specific to the implementation of the Server). The SNA Access Device is configured with all the Virtual Circuits 501 providing communication paths within the Wide Area Network between the SNA Access Device and the TN3270 Servers.

The configuration file 308 of each Telnet 3270 Server comprises configuration information of the Permanent Virtual Circuits (PVCs) that the Telnet 3270 server supports for all the destinations accross the WAN. Configuration files are all processed off-line to produce the SNA Access Device configuration table 500. In the example of FIG. 5, a Telnet session setup request from LU1 can use either PVC a or PVC b, leading to Server S1 and S2. Similarly, a Telnet session setup request message for LU2 can use PVC a that leads to Server S1, and so on.

The configuration file 308 of each Telnet 3270 Server also provides the TN3270 Server's IP addresses. These IP addresses are collected and saved within the configuration file for the SNA Access Device.

Finally, the configuration file 308 of each Telnet 3270 Server specifies a Permanent Virtual Circuit (PVC) to route the Telnet session request messages for Logical Units that are not listed explicitly in the configuration table (500). In the provided example, Server S3 processes all the Telnet session setup request messages comprising an LU name that is unknown by the SNA Access Device. PVC d leads to Server S3 and corresponds to the default routing for the Logical Units that are unknown from an SNA Access Device standpoint. The default mechanism provides some form of wild card routing capabilities to the SNA Access Device.

Proxy ARP Services Provided by the SNA Access Device

Figure 4:
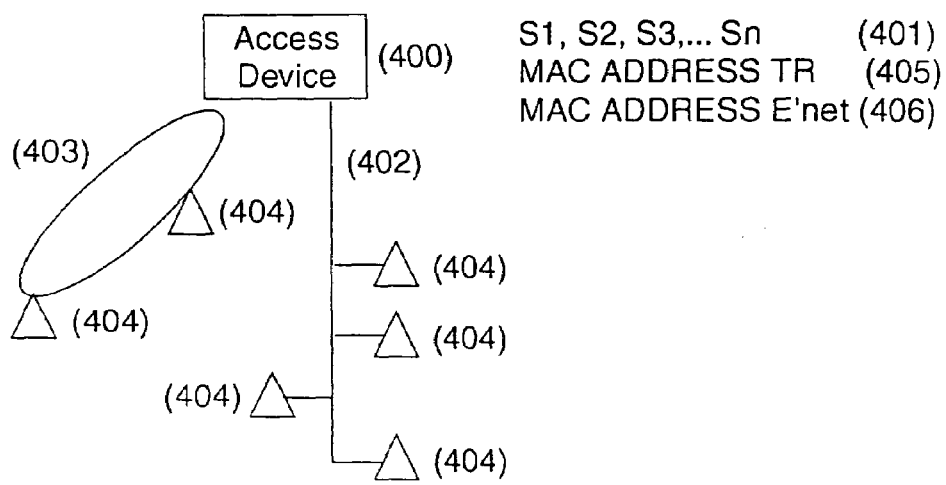
FIG. 4 illustrates how Proxy ARP (Address Resolution Protocol) Services are provided to Telnet 3270 Clients by the Access Device according to the present invention.

SNA Client Devices connected to the SNA Access Device use IP protocols to communicate to their Telnet Servers in charge of providing SNA access to the target Applications. As shown in FIG. 4, some SNA Client Devices 404 are connected via a Token Ring Local Area Network (LAN) 403 to the SNA Access Device 400. Other SNA Client Devices are attached via an Ethernet LAN 402 to this SNA Access Device 400. Since IP protocols are used, the very first message that an SNA Client device 404 attached via a LAN to the SNA Access Device 400 issues is an ARP (Address Resolution Protocol) request message.

An SNA Client device only knows the IP address of the TN3270 Server to use for a session. Over a Local Area Network, the Medium Access Control (MAC) of the box to which the traffic towards the destination Server must be determined. This is provided using ARP protocols where a request (called an ARP request) comprising the IP address of the destination is sent over the LAN. The box in charge of routing the traffic to the destination (the destination is identified by the IP address) replies over the LAN by specifying its MAC address (the message is called an ARP response).

An ARP control message is a broadcasted message over the Local Area Network (LAN). When any of the SNA Client Devices issues an ARP request message, containing the IP address 401 of the Server that the SNA Client device wants to reach, the SNA Access Device 400 traps the ARP request, and generates an ARP response that comprises the Medium Access Control (MAC) Address 405 and 406 of the SNA Access Device over the Local Area Network. The preceding condition tells the SNA Client Device that in order to reach the Server corresponding to the IP address comprised in the ARP request message, the MAC address of the SNA Access Device (comprised within the ARP response) has to be used as addressing information in every IP message sent over the Local Area Network.

For a link-attached SNA Client Device, because there is only one device (the SNA Access Device) at the other end of the link, the SNA Client device does not need a MAC address to be associated with the destination TN3270 Server. Therefore, proxy ARP services are not required for link attached SNA Client devices.

Processing a Session Setup Request from an Attached SNA Client Device

When an SNA Client device 301 issues a Telnet Session setup request message, the message is sent over the link (or LAN) from the SNA Client device to the SNA Access Device. This Telnet session setup request message is a TCP/IP message sent over the Telnet 3270 well-known port (Port 23) since it is a Telnet message.

The source IP address in the IP header of the message received by the SNA Access Device is the IP address of the SNA Client device. The destination IP address is the IP address of the Telnet Server (or set of Telnet Servers) to which the Telnet session request message must be sent to.

There could be several Telnet Servers with the same IP address if these Servers can all satisfy session setup requests from the same SNA Client device (or set of SNA Client Devices). For LAN attached workstations, the SNA Access Device that previously responded to the ARP request message from the SNA Client device receives the message as the SNA Access Device provides proxy-ARP services for the Telnet Server. For link attached SNA Client device, the message is also received by the SNA Access device, but proxy ARP services are not required. Using the configuration table 306, the SNA Access Device determines the Virtual Circuit across the WAN to forward the Telnet Session request message to the selected TN3270 Server. Across the selected Virtual Circuit, the message will then get to the target Telnet 3270 Server.

Exploiting the Configuration Tables

When a Telnet Session setup request message is received by an SNA Access Device, the SNA Access Device uses the LU addressing information within the received message to search the configuration table. If there is only one Permanent Virtual Circuit (PVC) in the PVC list within the configuration table 500 (i.e., only one TN3270 Server only can satisfy the request of the SNA Client device), the PVC is selected and used.

If there are several PVCs listed (i.e., several TN3270 Servers can satisfy the request of the SNA Client device), a choice must be made. In a preferred embodiment of the invention, a simple Round Robin mechanism is used. That is, PVCs are selected one after the other by the SNA Access Device in order to distribute the Telnet Session request messages to every Telnet 3270 Server capable to provide services for the specified SNA Client device.

Alternatively, in a more sophisticated embodiment, the SNA Access Device can regularly poll the Telnet 3270 Servers to obtain an estimation of their availability, load or both load and availability. The collected information can be used to select one Virtual Circuit among all possible ones listed in the configuration table, and to go to the best Telnet 3270 Server (a Telnet Server available and capable of providing session services for the requesting SNA Client device). There are typical implementations of such load balancing functionality like those provided for example by both IBM (International Business Machine) and Cisco Systems equipment providers.

Advantages

The main advantages associated to the invention may be listed as follows:

The TN3270 Client is completely isolated from the Wide Area Network protocol specificities. The TN3270 Client is, in fact, natively connected to the SNA Access Device whose role is to hide the particularities of the Wide Area Network;

From a Telnet 3270 protocol standpoint, the SNA Access Device is completely transparent. In other words, the Access Device is not seen from either the TN3270 Server or the SNA Client device running the TN3270 Client protocols;

SNA Client devices are standard TN3270 Client devices and Standard TN3270 Servers can be used;

The support of the invention does not require any modification of the Wide Area Network protocols; and The invention can be used for various Wide Area Network (WAN) technologies such as Frame Relay (FR), Asynchronous Transfer Mode (ATM), Switched Multi-megabit Data Services (SMDS) or Integrated Services Digital Network (ISDN).

As a final matter, it is important to note that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analog communication links.

While the invention has been particularly shown and described with reference to a preferred embodiment, it will be understood that various changes in form and detail may be made therein without departing from the spirit, and scope of the invention.

What is claimed is:

1. A method for providing seamless connection over a communication network for a Systems Network Architecture (SNA) session between a SNA Client and a remote SNA server, said method comprising the steps of:
   for each SNA client, defining a configuration table with an identification of the SNA client including a SNA Logical Unit (LU) name, one or more communication paths from the access device to the one or more servers associated with said SNA client, and an identification of said one or more servers including an Internet Protocol (IP) address;
   receiving at an access device for said communications network a request from said SNA client for establishing a session with a SNA server that provides services to said SNA client, said request including an identification of the SNA client, said access device being a separate functional device from said SNA server and said SNA client and which intercepts session requests from attached SNA clients and determines to which SNA server among multiple SNA servers to forward said session requests;
   selecting a communication path among multiple communication paths within the communication network to access said SNA server by referring to a configuration table of said access device, said configuration table comprising entries of one or more communication paths leading to each of one or more SNA servers for each SNA client that is connected to said access device, and wherein the selected communication path is one that provides access to the particular SNA server as identified by the configuration table; and
   forwarding the session request to said SNA server along the selected communication path;
   wherein said step of defining said configuration table further comprises the step of specifying a default communication path to access a server for SNA clients that are not identified in the configuration table.

2. The method of claim 1, further comprising the step of subsequently routing traffic associated with the session to the SNA server via the selected communication path.

3. The method of claim 2, wherein said step of selecting a communication path further comprises the step of selecting one server from among a plurality of servers associated with the SNA client according to pre-determined criteria selected from among network and server performance, sewer availability, and load balancing.

4. The method of claim 3, wherein said SNA client and an access device are connected on a Local Area Network, and wherein said step of receiving a request for establishing a session is preceded by the steps of:
   receiving on said Local Area Network an Address Resolution Protocol (ARP) request, said ARP request comprising the Internet Protocol (IP) address of a server the SNA client wants to access; and
   sending an ARP response to the SNA client, said ARP response comprising the Medium Access Control (MAC) address of the access device on the Local Area Network.

5. The method of claims 1, wherein each server comprises a configuration file comprising a list of SNA clients for which the server provides services, and for each of said SNA clients, a communication path within the communication network between the access device and said server, and wherein said step of defining a configuration table further comprises the step of:
   retrieving and consolidating the configuration files of each of said server in a single configuration table locally stored within the access device.

6. The method of claim 5, wherein said SNA client is identified by a SNA Logical Unit name, and said session request comprises the SNA Logical Unit name of the SNA client.

7. The method of claim 6, wherein said communication network is a Wide Area Network (WAN) based on a networking technology from among Frame Relay (FR), Asynchronous Transfer Mode (ATM), Switched Multi-megabit Data Services (SMDS) or Integrated Services Digital Network (ISDN).

8. The method of claim 7, wherein said communication paths are Permanent Virtual Circuits (PVCs) identified within said WAN.

9. The method of claim 8, wherein the access device attaches one or more SNA clients by serial links and Local Area Networks (LAN).

10. The method of claim 9, wherein said SNA operates a Telnet session with services from among a Telnet 3270 service and a Telnet 3270 enhanced service, and wherein said server is a Telnet server and said SNA client executes Telnet client services.

11. An access device for a communications network, said access device comprising:
   a receiving port for receiving a session request from a connected SNA client;
   a processing unit that selects a particular one of at least one SNA server connected to the communications network for routing said session request; and
   a transmitting port for providing a session connection between said SNA client and said particular SNA server via a virtual circuit connecting said SNA server with said access device across said communications network;
   wherein said processing unit selects a default communication path including a default SNA server when a SNA client requesting a session is not identified within a configuration table;
   wherein, for each SNA client, said configuration table is defined with an identification of the SNA client including a SNA Logical Unit (LU) name, one or more communication paths from the access device to the one or more servers associated with said SNA client, and an identification of said one or more servers including an Internet Protocol (IP) address; and
   wherein further said configuration table specifies a default communication path to access a server for SNA clients that are not identified in the configuration table.

12. The access device of claim 11, further comprising the configuration table, which provides a list of SNA clients and Internet Protocol addresses of associated SNA servers that support said SNA clients along with a permanent virtual link by which one of said associated SNA servers may be connected to said SNA client when said session request is received by said access device.

13. The access device of claim 12, further comprising means for providing Internet Protocol services including an Address Resolution Protocol (ARP) that utilizes an IP address of said SNA server that is included in an ARP request message of said SNA client to determine which SNA server to select.

14. The access device of claim 13, wherein multiple SNA servers support said SNA client and said processor selects one of said multiple SNA servers to connect said session request by evaluating one or more of a plurality of criteria including network and server performance, server availability, and load balancing.

15. The access device of claim 11, further comprising logic for, in response to receiving an Address Resolution Protocol (ARP) request comprising the Internet Protocol (IP) address of a server the SNA client wants to access, sending an ARP response to the SNA client, said ARP response comprising the Medium Access Control (MAC) address of the access device.

16. A network comprising:
at least one Systems Network Architecture (SNA) client;
at least one SNA server; and
an access device for enabling a session between said at least one SNA client and said at least one SNA server by establishing a virtual circuit with said SNA server across said network, said access device being a separate functional device from said SNA server and which intercepts session requests from attached SNA clients and determines to which SNA server among multiple SNA servers to forward said session requests, wherein said access device selects a default communication path including a default SNA server when the SNA client requesting a session is not identified within a configuration table;
wherein, for each SNA client, said configuration table is defined with an identification of the SNA client including a SNA Logical Unit (LU) name, one or more communication paths from the access device to the one or more servers associated with said SNA client, and an identification of said one or more servers including an Internet Protocol (IP) address; and
wherein further said configuration table specifies a default communication Path to access a server for SNA clients that are not identified in the configuration table.

17. The network of claim 16, wherein said access device is connected to said at least one SNA client via a direct link.

18. The network of claim 16, wherein said access device is connected to said at least one SNA client via a local area network.

19. The network of claim 16, wherein said access device comprises:
a receiving port for receiving a session request from said at least one SNA client;
a processing unit that selects a particular one of said at least one SNA server for routing said session request; and
a transmitting port for providing a session connection between said at least one SNA client and said particular SNA server via said virtual circuit.

20. The network of claim 19, wherein said access device further comprises a configuration table that provides a list of SNA clients and Internet Protocol addresses of associated SNA servers that support said SNA clients along with a permanent virtual link by which one of said associated SNA servers may be connected to said SNA client when said session request is received by said access device.

21. The network of claim 20, wherein said access device further comprises means for providing Internet Protocol services including an Address Resolution Protocol (ARP) that utilizes an Ip address of an SNA server that is included in an ARP request message of said SNA client to determine which one of said at least one SNA server to select.

22. The network of claim 21, wherein multiple SNA servers supports one of said SNA clients and said processing unit of said access device selects one of said multiple SNA servers to connect said session request by evaluating one or more of a plurality of criteria including network and server performance, server availability, and load balancing.

23. The network of claim 16, wherein said access device further comprises logic for, in response to receiving an Address Resolution Protocol (ARP) request comprising the Internet Protocol (IP) address of a server the SNA client wants to access, sending an ARP response to the SNA client, said ARP response comprising the Medium Access Control (MAC) address of the access device.

24. A computer program product comprising:
a computer readable medium; and
program instructions on said computer readable medium for execution within an access device, said program instructions including instructions for:
for each SNA client, defining a configuration table with an identification of the SNA client including a SNA Logical Unit (LU) name, one or more communication paths from the access device to the one or more servers associated with said SNA client, and an identification of said one or more servers including an Internet Protocol (IP) address;
receiving, at the access device, from an SNA client a request for establishing a session with a SNA server that provides services to said SNA client, said request including an identification of the SNA client, said access device being a separate functional device from said SNA server and which intercepts session requests from attached SNA clients and determines to which SNA server among multiple SNA servers to forward said session requests;
selecting a communication path within the communication network to access said SNA server by referring to a configuration table of said access device, said configuration table comprising one or more communication paths leading to one or more SNA servers for each SNA client that is connected to said access device;
selecting a default communication path to access a server for SNA clients that are not identified in the configuration table; and
forwarding the session request to said SNA server along the selected communication path when said configuration table includes the SNA server and forwarding the session request to said default communication path when said configuration table does not identify the server;
wherein said instructions for defining said configuration table further comprises instructions for specifying a default communication path to access a server for SNA clients that are not identified in the configuration table.

25. The computer program product of claim 24, wherein said program instructions for selecting a communication path further comprises program instructions for selecting one server from among a plurality of servers associated with the SNA client according to pre-determined criteria selected from among network and server performance, server availability, and load balancing.

* * * * *

UNITED STATES PATENT AND TRADEMARK OFFICE
CERTIFICATE OF CORRECTION

| | | |
|---|---|---|
| PATENT NO. | : 7,051,103 B1 | Page 1 of 1 |
| APPLICATION NO. | : 09/718187 | |
| DATED | : May 23, 2006 | |
| INVENTOR(S) | : Giroir et al. | |

It is certified that error appears in the above-identified patent and that said Letters Patent is hereby corrected as shown below:

Column 11, line 51, delete "sewer" and insert --server--.

Signed and Sealed this

Twenty-first Day of November, 2006

JON W. DUDAS
*Director of the United States Patent and Trademark Office*